3,439,050
COLOR-INHIBITED ALCOHOL COMPOSITION FOR PRODUCING PLASTICIZER ESTERS WITH IMPROVED COLOR
Charles Harlan McKeever, Meadowbrook, and Jerome Dohling, Huntingdon Valley, Pa., assignors to Rohm and Haas Company, Philadelphia, Pa., a corporation of Delaware
No Drawing. Original application Sept. 2, 1964, Ser. No. 394,037. Divided and this application Nov. 2, 1967, Ser. No. 680,025
Int. Cl. C07c 29/24, 69/76; C08f 45/38
U.S. Cl. 260—632.5    3 Claims

ABSTRACT OF THE DISCLOSURE

This invention provides a stable, color-inhibited alcohol composition comprising an alcohol selected from the group consisting of branched chain and straight chain alcohols of 8 to 18 carbon atom content, a compound selected from the group consisting of carbonyl and carbonyl-forming compounds in a minor contaminating amount, and a color-inhibiting amount of N,N-dimethylformamide.

---

This application is a division of our earlier U.S. application, Ser. No. 394,037, filed Sept. 2, 1964, now abandoned.

This invention relates to a color-inhibiting additive for higher alcohols whereby plasticizer esters of improved color may be obtained.

Plasticizer esters are quite generally prepared by esterifying a suitable straight chain or branched chain alcohol, e.g., $C_8$–$C_{18}$ alcohols, with an acidic reactant such as phthalic acid, maleic acid, adipic acid, azelaic acid, sebacic acid (or their anhydrides), as well as many others. Plasticizer esters of these types are in wide use today with resinous or polymeric materials, e.g., vinyl chloride polymers and copolymers, cellulosics, acrylate and methacrylate resins, etc.

In the preparation of the aforementioned plasticizers a serious problem has been and continues to be that of economically obtaining colorless, or only slightly colored products. This problem has been increased in recent years by the widespread availability and use of alcohols containing contaminants which cause off-color products. The contaminants which are most troublesome are now known to be carbonyl compounds and carbonyl-forming compounds such as acetals, aldehydes, ketones, etc.

Accordingly, it is an object of this invention to enhance the utility of alcohols containing carbonyl contaminants by the use of a specific color inhibiting additive, thereby enabling the production of ester plasticizers with improved color characteristics. It is a further object of the present invention to permit the use of more rigorous ester reaction conditions while still allowing the production of ester plasticizers with satisfactory color properties. Another object is to provide a novel alcoholic composition containing a color inhibiting additive for preventing development of objectionable color when it is used in subsequent esterification reactions. Other objects will appear hereinafter.

The above and other objects are secured, in accordance with this invention, by contacting the alcohol containing the color-producing carbonyl contaminants with a color-inhibiting amount of N,N-dimethylformamide (hereinafter termed merely dimethyl formamide) and esterifying an organic dicarboxylic aromatic or aliphatic acid (or anhydride thereof) under suitable esterification conditions with the alcohol. The dimethylformamide additive can be added to the alcohol prior to the esterification procedure or it can be added during the esterification reaction.

The esterification process to which this invention relates comprises the reaction of approximately 2.5 moles of alcohol per mole of the desired dicarboxylic acid or anhydride in the presence of a suitable acid catalyst such as p-toluene sulfonic acid, benzenesulfonic acid, sulfuric acid and the like, at temperatures of about 100° C. to 200° C. for a period of about one-half to 4 hours and, more preferably, for a period of about 1 to 2 hours. The reaction may, if desired, be carried out in the presence of an inert gas such as $CO_2$, nitrogen, etc., in order to exclude oxygen. The quantity of catalyst employed can be varied in accordance with its activity. For example, as little as 0.3% by weight of sulfuric acid or as much as 6–8% by weight of toluene sulfonic acid based on the weight of the alcohol charged may be employed.

Dibasic or dicarboxylic acids useful in the present invention may be aromatic or aliphatic and include those commonly used in the production of plasticizer esters. As examples, there may be mentioned phthalic acid, maleic acid, succinic acid, adipic acid, sebacic acid (or their anhydrides) and many others. Preferred are dibasic aliphatic acids having 4 to 10 carbon atoms or dibasic aromatic acids having 8 to 10 carbon atoms.

The higher alcohols useful in the present invention comprise those alcohols of (a) $C_8$–$C_{18}$ carbon atoms, (b) branched or straight chain, and (c) containing as impurities or contaminants carbonyl or carbonyl-forming compounds in the amount of about 0.05 to about 1%. Examples of suitable branched chain alcohols are alcohols comprising synthetic branched chain products (see, for example, U.S. Patents 2,327,066 and 2,637,746), which are typically produced by reacting an olefin with carbon monoxide and hydrogen in the presence of a catalyst, generally a cobalt salt, at elevated temperatures and pressures to form an aldehyde product having one more carbon atom than the starting olefin. The aldehyde product is then freed of cobalt and subsequently hydrogenated to form the corresponding alcohol products.

Another suitable class of alcohols with which the present invention is concerned comprises straight-chain fatty alcohols of 8–18 carbon atom content derived from natural fats and oils. These alcohols are produced by catalytic hydrogenation of carboxylic acids (or esters) using molecular hydrogen and catalysts under temperatures ranging usually from 200° C. to 350° C. and with hydrogen pressures of about 2000 to 4000 p.s.i. As catalysts there may be used copper, copper chromite, copper chromium oxide, zinc copper chromate, nickel-copper zincate, and salts of molybdic acid. Alcohols obtained by catalytic hydrogenation of fatty carboxylic acids or esters of fatty carboxylic acids also contain carbonyl and carbonyl-forming compounds as impurities or contaminants in objectionable color-forming amounts even after fractionation and distillation and other purification steps. These carbonyl impurities or contaminants are present in an objectionable, color-forming amount (observable after the alcohol is subjected to the esterification conditions described hereinbefore) of about 0.05 to 1.0 weight percent and, more usually, about 0.05 to 0.3 weight percent. A further reference may be made to U.S. Patent No. 1,839,974 to Lazier for additional descriptive material on the catalytic hydrogenation of carboxylic acids and esters thereof.

To demonstrate the effectiveness of the dimethylformamide additive with regard to the color of plasticizer esters prepared from alcohols treated in accordance with this invention, carbonyl contaminated alcohols were employed in a series of rigorous esterification processes designed to magnify any tendency for discoloration due to the contaminants which are present in the alcohol.

In the following table and examples, one mole of phthalic anhydride is reacted under a nitrogen atmosphere with 2.4 moles of the alcohol at 130° C., using as catalyst 1.16% $H_2SO_4$ by weight on the alcohol. Toluene is used as an azeotroping agent. Reaction is complete in approximately one hour. After washing with NaOH and water until neutral, the ester is stripped to a maximum pot temperature of 180°–185° C. under vacuum. It is then filtered while warm with the aid of Celite 545. The various amide additives used below demonstrate and illustrate the effectiveness of this invention.

TABLE A
[o-Phthalate esters]

| Example | Alcohol | Carbonyl content (wt. percent) | Additive (wt. percent on wt. of alcohol) | VCS[1] color |
|---|---|---|---|---|
| Control | n.Decyl | 0.1 | | 5 |
| 1 | do | 0.1 | Formamide (0.10%) | 3 |
| 2 | do | 0.1 | Formamide (0.15%) | 3+ |
| 3 | do | 0.1 | Dimethylacetamide (0.10%) | 5- |
| 4 | do | 0.1 | Dimethylbenzamide (0.10%) | 5- |
| 5 | do | 0.1 | Dimethylformamide (0.10%) | 3- |

[1] The Varnish Color Scale or VCS color is determined by means of the Hellige Color Comparitor. In this device, numbered and colored standard glass filters mounted in a disc are used to obtain a match with the sample, and the number is read and recorded. These colored glass filters conform to the 1933 Gardner Color Scale.

The data and examples above show the unexpected advantages which are obtained when the dimethylformamide additive is used. It is indeed surprising and completely unexpected that dimethylformamide produces a significant reduction in color of ester products, particularly in view of the prior art teachings that only primary amides show as unique stabilizing or color inhibiting effect with alcohols containing carbonyl contaminants. More particularly, reference is made to U.S. Patent 2,909,562 to Hughes et al. showing the advantages obtained by using primary amides to improve ester color, and the disadvantages which result by using a substituted amide such as acid acetanilide—see Table II of U.S. Patent 2,909,562. The data above also show that N,N-di-substituted amides such as dimethylacetamide and dimethylbenzamide effect no improvement in color of esters prepared in accordance with this invention. It is therefore all the more surprising that the specific di-substituted dimethylformamide produces the results which are obtained.

It can further be seen from Examples 1–5 that a color reduction of more than 40% is obtained (viz 3- VCS color reading with the 5 VCS of the control) by using dimethylformamide in a color-inhibiting amount with an n-decyl alcohol obtained by the catalytic hydrogenation of fats and oils as hereinbefore discussed. This same effect is observed with other alcohols of eight to eighteen carbon atom content derived from natural fats and oils by catalytic hydrogenation and with "oxo" alcohols of eight to eighteen carbon atom content. That is to say, the dimethylformamide additive when used in a color-inhibiting amount with the alcohols mentioned above will effect a reduction in color of about 30%–60% and more in the plasticizer esters produced therefrom, while little or no effect is observed with other secondary or tertiary amides. The color inhibiting amount of the additive can be varied in accordance with the amount and type of contaminants present in the alcohol and also in accordance with esterification conditions which are used in preparing the plasticizer esters, but ordinarily a color inhibiting amount of the dimethylformamide additive will vary from about 0.05 weight percent to about 1.0 weight percent based on the weight of the alcohol containing the contaminants, with a preferred range being about 0.1% to about 0.3%. As stated hereinbefore, the dimethylformamide additive can be added to the alcohol prior to the esterification procedure or it can be added during the esterification reaction. The dimethylformamide additive is compatible with alcohols containing the contaminants, and stable compositions having many useful months of shelf life can be prepared when the additive is incorporated therein.

EXAMPLE 6

Di-n-decyladipate is prepared by reacting n-decyl alcohol with adipic acid under the following conditions: 2.4 moles of the alcohol are mixed and reacted with the adipic acid using 2.4 ml. of sulfuric acid catalyst. The reaction mixture is refluxed for about two hours at temperatures ranging from about 100° C. to 130° C. at which time reaction is substantially complete. After washing with water and NaOH and stripping under vacuum the color of the ester is noted. In a comparison run, but using 0.1% by weight of dimethylformamide based on the weight of the alcohol as a color inhibiting additive, color formation is reduced by approximately 45–50% in comparison with the ester produced without the aid of the additive.

The performance of ester plasticizers prepared with the aid of dimethylformamide is not noticeably or appreciably altered. In particular, tests have been run which demonstrate that stabilized polyvinyl chloride formulations containing plasticizer esters prepared with the dimethylformamide additive compare favorably in performance properties with polyvinyl chloride compositions utilizing plasticizer esters which have been prepared without the aid of the dimethylformamide additive.

The foregoing description has been given for clearness of understanding only and no unnecessary limitations are to be understood therefrom. The invention is not limited to the exact details shown and described, for obvious modifications will occur to those skilled in the art.

We claim:
1. A stable, color-inhibited alcohol composition comprising (a) an alcohol having 8 to 18 carbons and selected from the group consisting of oxo alcohols and alcohols produced by the hydrogenation of natural fats and oils, (b) a compound selected from the group consisting of carbonyl and carbonyl-forming compounds in a minor contaminating amount, and (c) a color-inhibiting amount of N,N-dimethylformamide.

2. The composition of claim 1 wherein the alcohol is a straight chain alcohol.

3. The composition of claim 1 in which the carbonyl contaminant is present in the amount of about 0.05–1% by weight and the dimethylformamide additive is present in the amount of about 0.05% to 1% by weight.

References Cited

UNITED STATES PATENTS

| 1,987,601 | 1/1935 | Burke | 260—643 |
| 2,876,253 | 3/1959 | Hughes et al. | 260—632.5 |
| 2,903,477 | 9/1959 | Hughes et al. | 260—632.5 |
| 2,909,562 | 10/1959 | Hughes et al. | 260—632.5 |
| 3,296,318 | 1/1967 | Stark. | |
| 3,305,592 | 2/1967 | Acciarri et al. | |

LEON ZITVER, *Primary Examiner.*

J. E. EVANS, *Assistant Examiner.*

U.S. Cl. X.R.

260—31.8, 475, 485